(12) United States Patent
Sangeeta

(10) Patent No.: US 6,395,406 B1
(45) Date of Patent: May 28, 2002

(54) METHODS FOR PREPARING AND APPLYING COATINGS ON METAL-BASED SUBSTRATES, AND RELATED COMPOSITIONS AND ARTICLES

(75) Inventor: D Sangeeta, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/557,393

(22) Filed: Apr. 24, 2000

(51) Int. Cl.$^7$ .............................. B32B 15/01; B05D 1/00
(52) U.S. Cl. ..................... 428/650; 75/255; 148/527; 148/535; 148/537; 419/8; 419/9; 419/53; 419/54; 427/189; 427/190; 427/191; 427/192; 427/197; 427/198; 427/205; 428/546; 428/548; 428/678
(58) Field of Search ................. 428/546, 548, 428/553, 559, 561, 650, 652, 678; 427/189, 190, 191, 192, 197, 198, 205; 419/8, 9, 40, 53, 54; 148/527, 535, 537; 75/245, 249, 255

(56) References Cited

U.S. PATENT DOCUMENTS 3,102,044 A * 8/1963 Joseph ....................... 427/190
5,102,700 A * 4/1992 Baldi ......................... 427/190

OTHER PUBLICATIONS

"Ceramic Slurry Coatings for Advanced Heat Engines", by L. Kamo et al., Adiabatics, Inc., Columbus, IN, Proceedings of the International Thermal Spray Conference and Exposition, Orlando, FL, May 28–Jun. 5, 1992, pp. 45–49.

Copending U.S. Patent application entitled "a Method for Applying Coatings on Substrates", Ser. No. 09378,956, filed Aug. 23, 1999, by D. Sangeeta et al.

* cited by examiner

Primary Examiner—Robert R. Koehler
(74) Attorney, Agent, or Firm—Noreen C. Johnson; Christian G. Cabou

(57) ABSTRACT

A method for preparing an aluminum alloy-containing coating composition is described. A slurry containing a selected amount of aluminum is combined with at least one additional slurry containing a selected amount of a second metal which forms an alloy with aluminum. The resulting slurry mixture is applied to a metal substrate, and then heated to form a substantially devolatilized coating. The coating then receives a secondary heat treatment. Related compositions and articles are also described, as are processes for repairing a damaged or worn coating, utilizing the slurry.

37 Claims, No Drawings

METHODS FOR PREPARING AND APPLYING COATINGS ON METAL-BASED SUBSTRATES, AND RELATED COMPOSITIONS AND ARTICLES

BACKGROUND OF THE INVENTION

This invention relates generally to protective coatings for metal substrates. More particularly, it is directed to improved methods for preparing and applying ceramic coating compositions. The coatings are applied on metal substrates employed in high temperature applications, e.g., superalloy substrates used in turbine engines.

The power and efficiency of turbine engines typically increases as the operating temperature increases. However, the ability of the turbine to operate at elevated temperatures (e.g., 1000° C.–1150° C.) is limited by the ability of the turbine components to withstand the adverse effects associated with such operation. For example, turbine vanes and blades must be capable of withstanding the heat, oxidation and corrosion effects of the impinging hot gas stream, while still maintaining sufficient mechanical strength. The turbine components are often formed of a nickel-based superalloy, which usually must be covered with protective coatings which provide greater resistance to the effects of high temperatures, as compared to the superalloy itself.

Common examples of protective coating materials for turbine engine components are nickel aluminides and noble metal-aluminides, such as platinum aluminide. This type of material is usually deposited in several steps. First, the platinum is electroplated onto the blade, using P-salt or Q-salt electroplating solutions. The second step is usually carried out by an aluminiding technique. For example, the platinum layer can be diffusion-treated with aluminum vapor to form platinum aluminide.

When such a protective coating becomes worn or damaged, it must be carefully repaired, since direct exposure of the underlying substrate to excessive temperature may eventually cause the component to fail and adversely affect other parts of the engine. The coatings often have to be repaired several times during the lifetime of the component. The "overhaul" of the protective coating usually involves complete removal of the coating, followed by the application of a new coat of the material.

The aluminiding technique described above can sometimes be carried out to efficiently provide an aluminide-type repair coating. However, the process usually requires very high temperatures, often approaching the melting temperature of the base alloy itself. For this reason, it is often necessary to add a melting point suppressant to the repair alloy composition, to lower its melting temperature. In some situations, the addition of the melting point suppressant may compromise the integrity of the repair alloy.

Other aluminiding techniques can be used to apply protective coatings to the base alloy, either in a repair mode or as a "new make" coating. As an example, metal organic chemical vapor deposition (MOCVD) is sometimes used to aluminide a superalloy surface. However, MOCVD can be an expensive process, and is not always capable of producing the desired aluminide-type composition. Moreover, coating deposition rates for MOCVD are sometimes very slow. A lengthy coating process is often undesirable in a repair facility.

It should thus be apparent that new techniques for applying ceramic coatings-especially aluminide-type coatings- would be welcome in the art. The techniques should be efficient and not labor-intensive. They should also involve deposition of the coatings or their precursors at temperatures which are generally lower than those used in the prior art, e.g., at temperatures less than about 1000° C., and preferably, in the range of about 600° C. to about 1000° C. Moreover the techniques should be useful for coating selected portions of the substrate, e.g., only those sections which require repair. They should also preserve the integrity of the metal alloy surface.

BRIEF SUMMARY OF THE INVENTION

The present invention includes a method for preparing an aluminum alloy-containing coating composition, comprising the step of mixing a first slurry comprising a selected amount of aluminum with at least one additional slurry (i.e., a "second slurry") comprising a selected amount of a second metal which forms an alloy with aluminum. (For brevity, the first slurry is sometimes referred to as the "aluminum slurry"). The amount of aluminum and the amount of the second metal in the respective slurries are substantially proportional to the desired proportion of aluminum to the second metal for the coating composition. The second metal is usually selected from the group consisting of noble metals, nickel, and mixtures thereof. In some embodiments, a third slurry containing a third metal can also be combined with the first and second slurries. As an example, the second slurry can include platinum, while the third slurry can include nickel, to form a nickel-platinum-aluminide coating.

Another embodiment of this invention is directed to a method for applying an aluminum alloy-containing coating to a metal-based substrate, comprising the following steps:

a) mixing a first slurry comprising a selected amount of aluminum with a second slurry comprising a selected amount of a second metal which forms an alloy with aluminum, thereby forming a slurry mixture, wherein the amount of aluminum and the amount of the second metal in the respective slurries are substantially proportional to a desired proportion of aluminum to the second metal for the coating;

b) applying the slurry mixture to the metal-based substrate;

c) heating the applied slurry mixture to remove at least a portion of the volatile material contained therein, forming a substantially devolatilized coating; and d) subjecting the substantially devolatilized coating to a secondary heat treatment. Steps (c) and (d) can be combined into a single heating step with multiple stages. Moreover, a single slurry mixture containing all of the metals could be used, rather than employing separate slurries containing each metal, as described below.

A further embodiment is directed to a method for repairing a damaged or worn coating formed from an alloy of aluminum with at least one additional metal, applied over a metal-based substrate, comprising the following steps:

(i) removing the damaged or worn coating from a selected area on the substrate;

(ii) applying additional coating material over the selected area, by (A) mixing a slurry comprising a selected amount of aluminum with a slurry comprising a selected amount of the additional metal, thereby forming a slurry mixture, wherein the amount of aluminum and the amount of the additional metal in the respective slurries are substantially proportional to a desired proportion of aluminum to the additional metal for the alloy;

(B) applying the slurry mixture to the metal-based substrate;

(C) heating the applied slurry mixture to remove at least a portion of the volatile material contained therein; and (D) subjecting the coating material to a secondary heat treatment.

This process is effective for rapidly repairing worn coatings on various metal substrates, e.g., nickel-based superalloys used for turbine engine components.

Another embodiment of this invention is directed to a slurry composition. The slurry comprises aluminum and at least one additional metal which forms an alloy with aluminum. The additional metal is selected from the group consisting of a noble metal, nickel, and mixtures thereof.

An article also forms part of this invention. The article comprises:

(i) a metal-based substrate; and (ii) a volatile-containing slurry of aluminum and at least one additional metal which forms an alloy with aluminum, applied over the substrate. When the volatile components in the slurry have been removed, a green coating remains. The green coating can receive a secondary heat treatment, e.g., a diffusion heat treatment.

Further details regarding the various features of this invention are provided in the remainder of the specification.

DETAILED DESCRIPTION OF THE INVENTION

The aluminum-containing slurry of this invention usually includes a dispersion of aluminum metal powder in an appropriate solution, which can be aqueous or organic. The organic phase can be formed from a variety of organic solvents, e.g., ethanol or other alcohols; ketones, nitrile solvents (e.g., acetonitrile), and the like. Aqueous dispersions are sometimes preferred. The size of the aluminum powder particles in the dispersion may vary, but the average particle size is usually less than about 10 microns. The dispersion typically contains from about 10 to about 70 wt % aluminum. The desired level of aluminum will depend on various factors, such as the amount of aluminum required for the coating composition; the manner in which it will be applied; and the solubility and dispersibility of the aluminum in the solvent or solvent mixture. (In general, inorganic components and precursors thereof which may be useful for this invention are described in various references, e.g., *Inorganic Materials Chemistry Desk Reference*, by D. Sangeeta, CRC Press, 1997, page 8 et seq., which is incorporated herein by reference).

The slurry may contain various other additives, such as dispersants, wetting agents, deflocculants, stabilizers, anti-settling agents, binders, thickening agents, plasticizers, emollients, lubricants, surfactants, anti-foam agents, and curing modifiers. Examples of binders are chromium salts (e.g., dichromate), phosphate salts (e.g., aluminum phosphate), or molybdate salts. Alkali metal silicates are also sometimes used to lower the curing temperature of the slurry. In general, the additives are each used at a level in the range of about 0.01% by weight to about 10% by weight, based on the weight of the entire slurry composition. Those skilled in the art can determine the most effective level for any of the additives, without undue effort.

As mentioned above, at least one additional slurry (i.e., a "second slurry") is mixed with the aluminum slurry. The second slurry contains at least one metal selected from the group consisting of noble metals, nickel, and mixtures thereof.

The slurry may also include minor amounts (e.g., less than about 10% by weight) of other constituents. For example, the slurry may contain a melting point suppressant such as silicon or boron.

The second slurry includes a dispersion of the second metal (or mixtures of metals) in an appropriate solvent, which may be aqueous or organic. Higher-density solvents like terpineol are often used with relatively heavy metals, such as platinum. Lighter metals can usually be dispersed in lower-density solvents, such as the lower alcohols. Thickening agents can be used to adjust the viscosity of a solvent.

The second slurry typically contains an effective amount (e.g., about 0.01%–10% by weight) of at least one of the additives noted above for the aluminum slurry, e.g., dispersants, wetting agents, deflocculants, stabilizers, anti-settling agents, and the like. The solvent and the additives should be those which are generally compatible with the solvent and additives in the aluminum slurry. In other words, the subsequent mixing of the slurries should not cause substantial precipitation of silicon (if present), or of the metals. Moreover, the effectiveness of any additives which are required during the curing of the coating composition should not be compromised during the slurry-mixing step.

Those skilled in the art are aware that some of the components in the slurry may be pyrophoric in nature. Therefore, standard precautions must be taken when preparing and combining slurries. For example, the slurries may have to be stored and used in an inert atmosphere.

In some preferred embodiments, the metal in the second slurry is either platinum or nickel, so that the final coating composition is either platinum aluminide or nickel aluminide, respectively. Each dispersion typically contains from about 20 to about 60 wt % of the respective metal. Slurries of these metals are commercially available, or they can be prepared without undue effort. The commercial platinum slurries are sometimes referred to in the art as "platinum inks". Non-limiting examples include A-4338, A-3788, and A-6101XA, all available from the Engelhard Corporation of East Newark, N.J. Another example is Platinum Ink #6926, also available from Engelhard, which includes micron-sized platinum particles suspended in terpene. Some of these inks are described in U.S. Pat. Nos. 4,396,480; 5,306,411, and 5,569,633, which are incorporated herein by reference. Suitable platinum slurries may also be obtained from Johnson Matthey, Inc. Nickel slurries are also known in the art, and described in various references, e.g., U.S. Pat. No. 5,948,564, which is incorporated herein by reference.

As mentioned above, the slurries are mixed in proportions which result in the desired proportion of metals for the coating composition. For a platinum aluminide coating, the atomic ratio of platinum to aluminum is usually in the range of about 1:99 to about 80:20, and preferably, in the range of about 45:55 to about 55:45. For a nickel aluminide coating, the atomic ratio of nickel to aluminum is usually in the range of about 5:95 to about 80:20, and preferably, in the range of about 45:55 to about 55:45. The proportion of each metal will depend in large part on the desired characteristics for the coating itself.

Methods for mixing the slurries are well-known in the art. Any technique which thoroughly combines the slurries while keeping the metals and additives homogeneously distributed should be suitable. Exemplary techniques include ultrasonic agitation, or the use of a paint mixer or ball mill. The mixing time will depend on the particular metals and additives involved. As an example, the mixing time is usually about 5 minutes to about 90 minutes for a slurry mixture having a total weight of about 0.5 kg to about 10 kg. Longer mixing times are usually necessary for larger volumes of materials.

As mentioned above, a third slurry may be used to introduce a third metal. As in the case of the other slurries, the third slurry can include either an aqueous or an organic solvent. The slurry also typically contains an effective amount (e.g., about 0.01%–10% by weight) of at least one of the additives noted above. Moreover, the solvent and the additives for the third slurry should be those which are generally compatible with the solvent and additives in the aluminum slurry and in the second slurry. Various mixing-sequences could be carried out. For example, the third slurry could be added to a mixture of the first slurry and the second slurry. Alternatively, the second slurry and the third slurry could be pre-mixed, and then added to the first slurry. Those skilled in the art will be able to readily determine the most appropriate mixing scheme.

The metal for the third slurry may be any of those described above for the second slurry. The proportion of metals in a three-metal slurry mixture depends primarily on the desired coating composition, and its end use environment. As an example, those skilled in the art understand that relatively high levels of aluminum are employed for the coating if substantial aluminum depletion is expected to occur.

In some preferred embodiments, the third slurry comprises a noble metal. This is often the case in those instances in which the second slurry comprises nickel. Examples of the noble metals are platinum, palladium, iridium, rhodium, and ruthenium. Platinum and palladium are the preferred noble metals. In some embodiments, platinum is most preferred, and the resulting coating would be platinum-nickel-aluminide. As mentioned above, noble metal slurries (e.g., the platinum-type) are known in the art and commercially available, or can be prepared without undue effort. In such a slurry mixture, the amount of aluminum is usually in the range of about 1 wt % to about 85 wt %, and the amount of the noble metal is in the range of about 15 wt % to about 99 wt %. The amount of nickel will constitute about 1 wt % to about 50 wt % of the amount of the noble metal, i.e., in substitution for that portion of the noble metal. (These amounts are based on total slurry weight).

In some preferred embodiments, the amounts of aluminum, nickel, and noble metal are selected to provide a final coating composition as follows: about 35 atom % to about 65 atom % aluminum (most preferably, about 45 atom % to about 55 atom %); about 15 atom % to about 35 atom % of the noble metal (most preferably, about 20 atom % to about 30 atom %); and about 15 atom % to about 35 atom % nickel (most preferably, about 20 atom % to about 30 atom %), based on the total amount of aluminum, nickel, and metal in the final coating, after all heat treatments.

As mentioned above, the slurry mixture is applied to a metal-based substrate. The substrate can be formed from a variety of metals or metal alloys. The term "metal-based" in reference to substrates disclosed herein refers to those which are primarily formed of metal or metal alloys, but which may also include minor amounts of non-metallic components, e.g., ceramics, intermetallic phases, or intermediate phases. Usually, the substrate is a heat-resistant alloy, e.g., superalloys which typically have an operating temperature of up to about 1000–1150° C. The term "superalloy" typically embraces complex cobalt- or nickel-base alloys which include one or more other elements, such as aluminum, tungsten, molybdenum, titanium, and iron. Superalloys are described in various references, such as U.S. Pat. Nos. 5,399,313 and 4,116,723, both incorporated herein by reference. Directionally solidified and single crystal superalloys may also be used in this invention. High temperature alloys are also generally described in Kirk-Othmer's *Encyclopedia of Chemical Technology*, 3rd Edition, Vol. 12, pp. 417–479 (1980), and Vol. 15, pp. 787–800 (1981).

Nickel-base superalloys typically include at least about 40 wt % Ni. Illustrative alloys are designated by the trade names Inconel®, Nimonic®, Rene® (e.g., Rene®80-, Rene®95 alloys), and Udimet®. Cobalt-base superalloys typically include at least about 30 wt % Co. Commercial examples are designated by the trade names Haynes®, Nozzaloy®, Stellite®, and Ultimet®. The actual configuration of a substrate may vary widely. For example, the substrate may be in the form of various turbine engine parts, such as combustor liners, combustor domes, shrouds, buckets, blades, nozzles, or vanes.

The slurry mixture of this invention may be applied to the substrate by a variety of techniques known in the art. Various texts are instructive in this regard, e.g., the Kirk-Othmer *Encyclopedia of Chemical Technology*, 4th Edition, Vol. 5, pp. 606–619; as well as the *Technology of Paints, Varnishes and Lacquers*, Edited by C. Martens, Reinhold Book Corporation 1968. For example, the slurry mixture can be slip-cast, brushed-painted, dipped, sprayed, flow-coated, roll-coated, or spun-coated onto the substrate surface. U.S. patent application Ser. No. 09/378,956 (D. Sangeeta et al, filed Aug. 23, 1999) also describes some aspects of slurry technology, and is incorporated herein by reference.

In some preferred embodiments, the slurry mixture is deposited on the substrate in at least two applications. The use of these thinner "sub-layers" appears to result in greater green strength for the overall layer after removal of the volatiles, while also enhancing adhesion of the layer to the substrate. The number of applications will depend in part on the composition of the slurry and the desired thickness of the overall layer. For an overall slurry thickness (after removal of the volatile components) in the range of about 1 micron to about 10 microns, two applications of the slurry are often desirable. In preferred embodiments, the volatile-removing heat treatment (or multiple heat treatments) discussed below is carried out after each of the applications of slurry. However, it may sometimes be possible to avoid the heat treatment until after the last application of the slurry, e.g., when the overall coating is very thin.

After being deposited, the slurry mixture (or each sub-layer of the slurry mixture) is heated to remove at least a portion of the volatile material contained therein, forming a substantially-devolatilized coating, i.e., a "green" coating. (This particular heat treatment can be referred to as an "evaporation step" or "evaporation stage".) The heating temperature will depend on various factors, such as the particular rheological characteristics of the coating composition; the evaporation rates for the volatile components in the slurry composition, and the shrinkage rate of the coating as the volatile components evaporate. (The volatility of components in the slurry composition can be determined by a variety of techniques, such as differential thermal analysis (DTA) and thermal gravimetric analysis (TGA)). Usually, the heating temperature for this evaporation stage is in the range of about 100° C. to about 400° C. It is not necessary for all of the volatile material to be removed in this step, since the higher-boiling components will evaporate or decompose during the secondary heat treatment, discussed below.

The choice of heating technique is usually not critical. A conventional oven or an IR heat lamp is frequently employed. Alternatively, rapid thermal annealing can be used for very thin coatings. Sometimes, the slurry mixture is gradually heated to a temperature approximately equal to the boiling point of the least-volatile component. The temperature can be maintained at that level until substantially all of the volatile materials have been evaporated. If the temperature is raised too quickly, the rapid evaporation of volatile components can lead to bubbling, which may result in coating defects. When removing volatile components, the heating is usually done in an air atmosphere.

The green coating is usually subjected to a secondary heat treatment after the volatile components have been removed. The secondary heat treatment is carried out at a temperature higher than the first heat treatment. The secondary heat treatment is sometimes designated as a "diffusion heat treatment", and its use is generally known in the art. The secondary heat treatment often densites or sinters the coating, and sometimes results in crystallization. The most appropriate time and temperature for the secondary heat treatment depends in part on the particular metals present in the slurry. (The time period is related to the time required to form various aluminum phases, such as metallic-, bimetallic-, and trimetallic aluminides). Usually, the secondary heat treatment is carried out at a temperature in the range of about 800° C. to about 1200° C, for about 30 minutes to about 8 hours. In some preferred embodiments, the secondary heat treatment is carried out at a temperature in the range of about 900° C. to about 1000° C. for about 60 minutes to about 4 hours. This treatment may be carried out in an inert gas atmosphere, e.g., argon or nitrogen, or in a vacuum. Sometimes, the inert gas is mixed with hydrogen.

It should be understood that heating of the applied coating could encompass one step, having at least two stages. For example, in a first stage, the coating could gradually be heated with increasing temperature to remove some or substantially all of the volatile components. In a second stage, the temperature could then be increased (usually rapidly) to a level sufficient to sinter, crystallize, or diffusion heat-treat the coating, as described above.

The thickness of the aluminum alloy coating will depend in large part on the desired end use of the component which incorporates the substrate. For a turbine engine component, the thickness will usually be in the range of about 10 microns to about 200 microns. In some preferred turbine engine applications, the thickness is in the range of about 10 microns to about 30 microns.

Variations on the process described above are possible. For example, a single slurry could be used, containing aluminum and at least one other metal. As illustrated previously, the metals are often present in the form of metal salts, e.g., $AlCl_3$, $PtCl_2$, and $NiCl_2$. The metals would be present according to the proportions desired for the final coating. The slurry could be prepared by mixing separate slurries of each metal, or by adding all of the salts to a single bath, for example. The single slurry would contain any of the various additives discussed above. In addition to following general safety procedures, care should be taken to keep each of the metal components well-dispersed therein. The slurry can then be applied to the substrate and heated under conditions sufficient to remove substantially all of the volatile material contained therein, and to perform the secondary treatment.

Another embodiment of this invention is directed to a process for repairing a damaged or worn coating which had been formed from an alloy of aluminum. Such a coating is one which had been applied over a metal-based substrate, e.g., a superalloy component. In the first step of the process, the damaged coating is removed from a selected area on the substrate by conventional procedures, e.g., chemical cleaning and stripping techniques.

In the second step of the process, additional coating material (i.e., replacement coating material) is applied over the selected area, by:

(A) mixing a slurry comprising a selected amount of aluminum with a slurry comprising a selected amount of an additional metal, thereby forming a slurry mixture. The amount of aluminum and the amount of the additional metal in the respective slurries are substantially proportional to a desired proportion of aluminum to the additional metal for the alloy. Step (B) follows:

(B) applying the slurry mixture to the metal-based substrate. Various application techniques are possible, as noted above. Step (C) follows:

(C) heating the applied slurry mixture to remove at least a portion of the volatile material contained therein, forming a substantially devolatilized coating. Step (D) follows:

(D) subjecting the substantially devolatilized coating to a secondary heat treatment. As described previously, steps (C) and (D) can be combined into one continuous heating step.

The additional metal for the aluminum alloy is usually nickel or a noble metal. As described previously, three slurries are sometimes used in combination, each containing a metal, thereby forming a coating such as nickel-platinum-aluminide. Coating repair is a very important process during the manufacture and assembly of gas turbine engines, or during their overhaul after a length of service.

Another embodiment of this invention is a slurry composition which comprises aluminum and a second metal which forms an alloy with aluminum. The second metal is usually selected from the group consisting of noble metals, nickel, and mixtures thereof. As described previously, the amount of aluminum in the slurry is typically in the range of about 1 wt % to about 85 wt %, based on total slurry weight. As discussed above, the slurry composition may comprise three metals, such as aluminum, nickel, and platinum. The slurry composition can be used to repair an aluminide-based coating on a superalloy substrate.

Still another embodiment of this invention is directed to an article, comprising:

(i) a metal-based substrate; and (ii) a slurry comprising aluminum and at least one additional metal (e.g., nickel or a noble metal) which forms an alloy with aluminum, applied over the substrate.

As described previously, removal of the volatile components from the slurry, along with a secondary heat treatment, results in a substrate coated with an aluminum alloy layer. The substrate is usually a superalloy, and the coating is often platinum aluminide.

The following prophetic examples are provided for illustration, and should not be considered to be any type of limitation on the scope of the present invention.

EXAMPLE 1

In this example, three slurries are used to form a nickel-platinum-aluminide coating. Slurry C is aluminum-based (Alseal®625), and is of a type commercially available. It contains about 38% by weight aluminum, along with a silicone, a chromium salt and a ceramic binder. Slurry A is platinum-based, and is also commercially available. It contains about 65% by weight platinum, in the form of fine particles having an average diameter of less than about 8 microns. Slurry A also contains terpineol solvent, as well as various organic binders. This slurry is diluted with sufficient ethanol to form a 50% platinum slurry/50% ethanol composition, by weight. Slurry B is nickel-based. It is prepared by suspending nickel powder (average particle size of about 10 microns) in water and ethanol. Slurry B also contains conventional thickeners and surfactants. The concentration of nickel metal in the slurry is about 40% by weight. A summary of the three slurries is provided below:

TABLE 1

| SLURRY A | SLURRY B | SLURRY C |
| --- | --- | --- |
| Pt Slurry - 90 wt % | Ni Slurry - 90 wt % | Al Slurry - 90 wt % |
| $PtCl_2$ - 8.8 wt % | $NiCl_2$ - 8.8 wt %* | $AlCl_3$ - 8.8 wt % |
| HCl - 1.0 wt % | HCl - 1.0 wt % | HCl - 1.0 wt % |
| Surfactant** | Aq. Anionic | Aq. Anionic |
| –0.1 wt % | Surf.*** –0.1 wt % | Surf.*** –0.1 wt % |

*Used in the form of $NiCl_2 \cdot 6H_2O$.
**Conventional surfactant for platinum slurries.
***Aqueous organic surfactant.

The three slurries have a combined volume of about 250 ml. The amount of each slurry employed is selected to provide the following ratio for the metals: 25 mole % Pt:25 mole % Ni:50 mole % Al.

The slurries are mixed with a conventional paint mixer for about 30 minutes. In one run, slurry A is added to slurry C, followed by the mixing of this pre-mixture. Slurry B is then added to the pre-mixture, followed by additional mixing.

The well-stirred mixture is then spray-coated onto the surface of a nickel-base superalloy, as a series of about 3–5 sub-layers. Multiple passes are used to apply each sub-layer. Each sub-layer is baked at 400° C. for about 30 minutes, prior to the application of the next sub-layer.

After the last heat treatment at 400° C., a secondary heat treatment is carried out, at about 900° C.–1000° C. The resultant coating has an average thickness in the range of about 1–4 mils (25–101 microns). Multiple samples are prepared. The coatings are relatively uniform, with the thickness varying between about 2.5–25 microns. The thinner coatings tend to be more uniform than the thicker coatings.

EXAMPLE 2

Example 1 is repeated, with one change: the inorganic binder, $PtCl_2$, is replaced with $Pt(NO_3)_2$.

EXAMPLE 3

Example 1 is repeated, with one change: the inorganic binder, $NiCl_2$, is replaced with $Ni(NO_3)_2 \cdot 6H_2O$.

EXAMPLE 4

Example 1 is repeated, with one change: the inorganic binder, $AlCl_3$, is replaced with $Al(NO_3)_2$.

EXAMPLE 5

Various compounds of platinum, nickel, and aluminum are mixed together and used for thin (about 1 micron) coating applications, as described previously in the specification. The following components are combined with a paint mixer:

| $PtCl_2$ | 0.25 mole % (Pt) |
| --- | --- |
| $NiCl_2$ | 0.25 mole % (Ni) |
| $AlCl_3$ | 0.50 mole % (Al) |
| HCl | 0.05 mole % |
| Water | 50 wt %* |

*(Based on weight of entire mixture. Approximately 50 grams of the Pt-Ni-Al mixture is added to approximately 50 grams of water)

EXAMPLE 6

Example 5 is repeated, with one change: $PtCl_2$ is replaced with $Pt(NO_3)_2$.

EXAMPLE 7

Example 5 is repeated, with one change: $NiCl_2$ is replaced with $Ni(NO_3)_2 \cdot 6H_2O$.

EXAMPLE 8

Example 5 is repeated, with one change: $AlCl_3$ is replaced with $Al(NO3)_2$.

EXAMPLE 9

Example 5 is again repeated, replacing HCl with $HNO_3$, and replacing all of the salts (while maintaining molar proportions) with the following: $Pt(NO_3)_2$, $Ni(NO_3)_2 \cdot 6H_2O$, and $AlCl_3$.

EXAMPLE 10

Example 1 is repeated, with the following change: slurry B is a "pure" nickel slurry, containing no inorganic binders, while slurry C is a pure aluminum slurry, containing no inorganic binders. The secondary heat treatment is carried out at a higher temperature than in Example 1, e.g., in the range of about 1100° C.–1200° C.

EXAMPLE 11

Example 1 is repeated, with the following change: slurry A is a "pure" platinum slurry, containing no inorganic binders, while slurry C is a pure aluminum slurry, containing no inorganic binders. The secondary heat treatment is carried out at a temperature in the range of about 1100° C.–1200° C.

EXAMPLE 12

Example 1 is repeated, with the following change: slurry A is a "pure" platinum slurry, containing no inorganic binders, while slurry B is a pure nickel slurry, containing no inorganic binders. The secondary heat treatment is carried out at a temperature in the range of about 1100° C. –1200° C.

EXAMPLE 13

This example is similar to example 1, except that each of the slurries is non-aqueous. Various solvents are used in place of water, such as xylene, alcohols, olefins, and oils.
Slurry D
Platinum slurry from Engelhardt, containing terpineol solvent diluted with ethanol. The slurry contains about 65 wt % platinum.
Slurry E
Nickel slurry—90 wt %
Nickelocene $(C_5H_5)_2Ni$—9.8 wt %

Organic surfactant—0.1 wt %
Slurry F
Aluminum slurry—90 wt %
Al(CH$_3$)$_3$—9.8 wt %
Organic surfactant—0.2 wt %

The slurries are mixed with a conventional paint mixer for about 15–45 minutes. In one run, slurry D is added to slurry F, followed by the mixing of this pre-mixture in an inert atmosphere. Slurry E is then added to the pre-mixture, followed by additional mixing in an inert atmosphere. The well-stirred mixture is then spray-coated onto the surface of a nickel-base superalloy.

The as-deposited coating is baked at 400° C., followed by a diffusion heat treatment at about 900° C.–1000° C. The resultant coating has an average thickness in the range of about 1–4 mils (25–101 microns). (Multiple samples are prepared). The coatings are relatively uniform, with the thickness varying between about 2.5–25 microns. The thinner coatings tend to be more uniform than the thicker coatings.

EXAMPLE 14

Example 13 is repeated in a series of other runs, in which the binder, Al(CH$_3$)$_3$, is replaced with other aluminum alkyls and aryls, e.g., triethylaluminum; tri-n-butylaluminum, triphenylaluminum, and the like.

Some of the preferred embodiments have been set forth in this disclosure for the purpose of illustration. However, the foregoing description should not be deemed to be a limitation on the scope of the invention. Accordingly, various modifications, adaptations, and alternatives may occur to one skilled in the art without departing from the spirit and scope of the claimed inventive concept.

All of the patents, articles, and texts mentioned above are incorporated herein by reference.

What is claimed:

1. A method for preparing an aluminum alloy-containing coating composition, comprising the step of mixing a first slurry comprising a selected amount of aluminum with at least one additional slurry comprising a selected amount of a second metal which forms an alloy with aluminum, wherein the amount of aluminum and the amount of the second metal in the respective slurries are substantially proportional to the desired proportion of aluminum to the second metal for the coating composition.

2. The method of claim 1, wherein the second metal is selected from the group consisting of noble metals, nickel, and mixtures thereof.

3. The method of claim 1, wherein the first slurry comprises a dispersion of aluminum metal particles in an aqueous solution.

4. The method of claim 3, wherein the first slurry comprises about 10 wt % to about 70 wt % aluminum.

5. The method of claim 1, wherein the first slurry further comprises at least one additive selected from the group consisting of binders, stabilizers, thickening agents, dispersants, deflocculants, anti-settling agents, plasticizers, emollients, lubricants, surfactants, anti-foam agents, and curing modifiers.

6. The method of claim 1, wherein the additional slurry comprises platinum, and the coating composition comprises platinum aluminide.

7. The method of claim 6, wherein the additional slurry comprises about 20 wt % to about 60 wt % platinum.

8. The method of claim 6, wherein the additional slurry further comprises at least one additive selected from the group consisting of binders, stabilizers, thickening agents, dispersants, deflocculants, anti-settling agents, plasticizers, emollients, lubricants, surfactants, anti-foam agents, and curing modifiers.

9. The method of 6, wherein the atomic ratio of platinum to aluminum in the slurry mixture ranges from about 1:99 to about 80:20.

10. The method of claim 1, wherein the additional slurry comprises nickel, and the coating composition comprises nickel aluminide.

11. The method of claim 10, wherein the additional slurry further comprises at least one additive selected from the group consisting of binders, stabilizers, thickening agents, dispersants, deflocculants, anti-settling agents, plasticizers, emollients, lubricants, surfactants, anti-foam agents, and curing modifiers.

12. The method of 10, wherein the atomic ratio of nickel to aluminum in the slurry mixture ranges from about 5:95 to about 80:20.

13. The method of claim 10, wherein a third slurry comprising a metal is mixed with the slurry comprising aluminum and the slurry comprising nickel.

14. The method of claim 13, wherein the third slurry comprises a noble metal.

15. The method of claim 13, wherein the third slurry further comprises at least one additive selected from the group consisting of binders, stabilizers, thickening agents, dispersants, deflocculants, anti-settling agents, plasticizers, emollients, lubricants, surfactants, anti-foam agents, and curing modifiers.

16. The method of claim 14, wherein the amount of aluminum, nickel, and noble metal in the slurry mixture is selected to provide a final coating composition of about 35 atom % to about 65 atom % aluminum; about 15 atom % to about 35 atom % of the noble metal; and about 15 atom % to about 35 atom % nickel, based on the total amount of aluminum, nickel, and metal in the final coating composition.

17. The method of claim 16, wherein the noble metal is platinum.

18. A method for applying an aluminum alloy-containing coating to a metal-based substrate, comprising the following steps:

(a) mixing a first slurry comprising a selected amount of aluminum with a second slurry comprising a selected amount of a second metal selected from the group consisting of a noble metal, nickel and mixtures thereof, which forms an alloy with aluminum, thereby forming a slurry mixture, wherein the amount of aluminum and the amount of the second metal in the respective slurries are substantially proportional to a desired proportion of aluminum to the second metal for the coating;

(b) applying the slurry mixture to the metal-based substrate;

(c) heating the applied slurry mixture to remove at least a portion of the volatile material contained therein, forming a substantially devolatilized coating; and (d) subjecting the substantially devolatilized coating to a secondary heat treatment.

19. The method of claim 18, wherein the slurry mixture comprises at least one additive selected from the group consisting of binders, stabilizers, thickening agents, dispersants, deflocculants, anti-settling agents, plasticizers, emollients, lubricants, surfactants, anti-foam agents, and curing modifiers.

20. The method of claim 18, wherein the slurry mixture is applied to the substrate by a technique selected from the group consisting of slip-casting, brushing, painting, dipping, flow-coating, roll-coating, spin coating, and spraying.

21. The method of claim 18, wherein the applied slurry mixture is heated in step (c) at a temperature in the range of about 100° C. to about 400° C.

22. The method of claim 18, wherein the secondary heat treatment of step (d) is carried out at a temperature in the range of about 800° C. to about 1200° C.

23. The method of claim 18, wherein steps (c) and (d) are combined into one step, having at least two heating stages.

24. The method of claim 18, wherein a third slurry comprising a metal is mixed with the first slurry and the second slurry in step (a).

25. The method of claim 24, wherein the second slurry comprises platinum, and the third slurry comprises nickel.

26. The method of claim 18, wherein the metal-based substrate is a superalloy.

27. The method of claim 26, wherein the superalloy is nickel-based.

28. The method of claim 18, wherein the metal-based substrate is a component of a turbine engine.

29. A method for forming a platinum-aluminide coating on a superalloy substrate, comprising the following steps:
   (I) applying a volatile-containing slurry mixture to the substrate, wherein said mixture comprises a selected amount of aluminum and a selected amount of platinum, wherein the amounts of aluminum and platinum are substantially proportional to a desired proportion of aluminum to platinum for the coating; and then
   (II) heating the applied slurry mixture under conditions sufficient to remove substantially all of the volatile material contained therein, and to diffusion heat-treat the substantially devolatilized coating.

30. The method of claim 29, wherein the atomic ratio of platinum to aluminum in the slurry mixture ranges from about 1:99 to about 80:20.

31. The method of claim 29, wherein heating step (II) is carried out in a first heating stage in the range of about 100° C. to about 400° C., and in a second heating stage in the range of about 800° C. to about 1200° C.

32. A method for repairing a damaged or worn coating formed from an alloy of aluminum with at least one additional metal, applied over a metal-based substrate, comprising the following steps:
   (i) removing the damaged or worn coating from a selected area on the substrate; and then
   (ii) applying additional coating material over the selected area, by
      (A) mixing a slurry comprising a selected amount of aluminum with a slurry comprising a selected amount of the additional metal, thereby forming a slurry mixture, wherein the amount of aluminum and the amount of the additional metal in the respective slurries are substantially proportional to a desired proportion of aluminum to the additional metal for the alloy;
      (B) applying the slurry mixture to the metal-based substrate;
      (C) heating the applied slurry mixture to remove substantially all of the volatile material contained therein, forming a substantially devolatilized coating; and
      (D) subjecting the substantially devolatilized coating to a secondary heat treatment sufficient to sinter, diffuse, or crystallize the substantially devolatilized coating.

33. The method of claim 32, wherein the additional metal is selected from the group consisting of a noble metal, nickel, and mixtures thereof.

34. A slurry composition comprising aluminum and platinum and, optionally, nickel.

35. The slurry composition of claim 34, wherein the amount of aluminum is in the range of about 1 wt % to about 85 wt %, based on total slurry weight.

36. An article, comprising:
   (i) a metal-based component of a turbine engine; and
   (ii) a volatile-containing slurry which comprises aluminum and at least one additional metal selected from the group consisting of a noble metal, nickel and mixtures thereof, which forms an alloy with aluminum, applied over the component of the turbine engine.

37. The article of claim 36, wherein the volatile components in the slurry have been substantially removed, so as to form a green coating.

* * * * *